Aug. 19, 1969   D. SCARAMUCCI   3,462,118
BALL VALVE FOR USE BETWEEN FLANGES
Filed Aug. 7, 1967   2 Sheets-Sheet 1

INVENTOR.
DOMER SCARAMUCCI
BY
Dunlap and Laney
ATTORNEYS

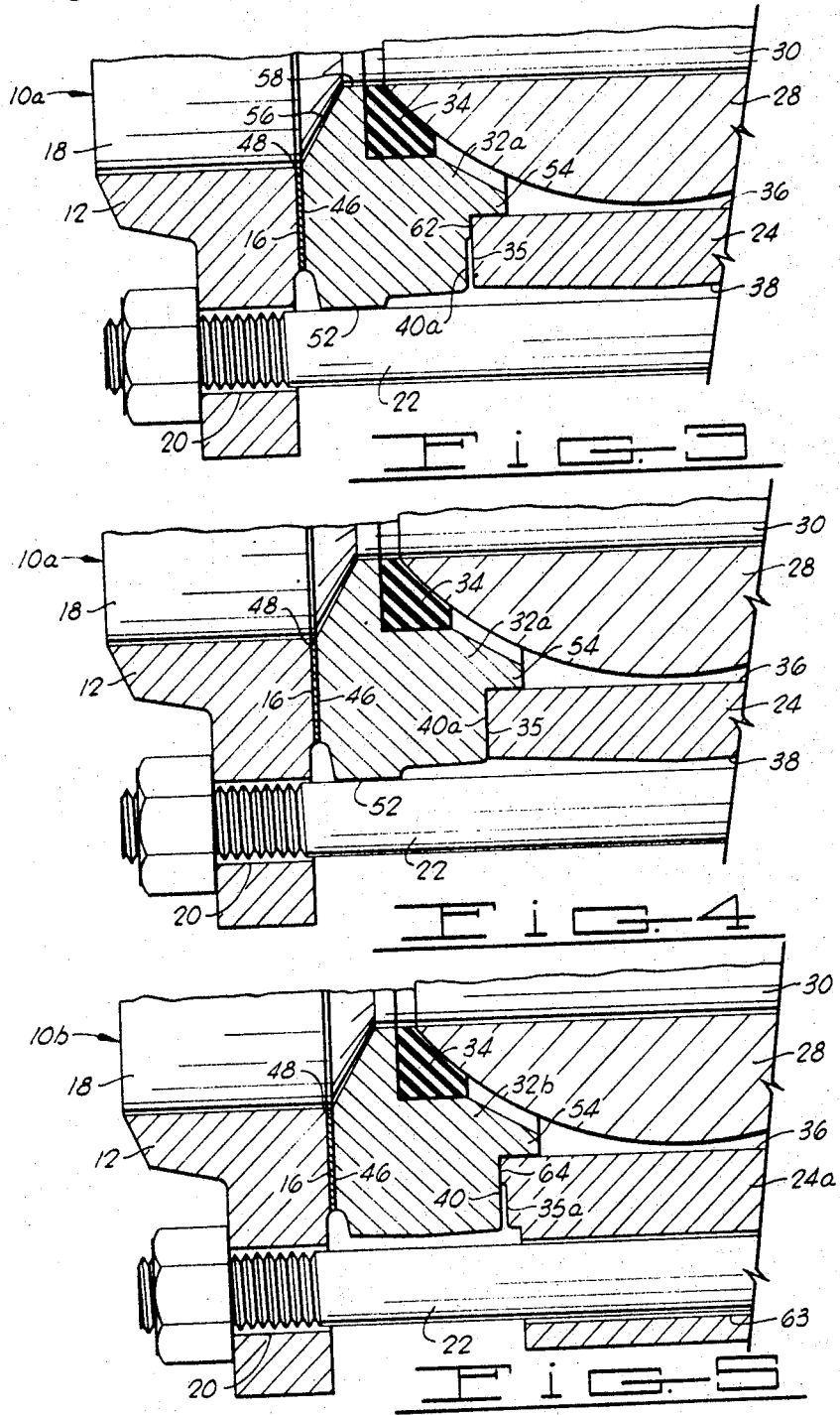

United States Patent Office
3,462,118
Patented Aug. 19, 1969

1

3,462,118
BALL VALVE FOR USE BETWEEN FLANGES
Domer Scaramucci, Oklahoma City, Okla., assignor to Balon Corporation, Oklahoma City, Okla., a corporation of Oklahoma
Filed Aug. 7, 1967, Ser. No. 658,667
Int. Cl. F16k 5/06, 51/00; F16l 19/02
U.S. Cl. 251—151                          16 Claims

ABSTRACT OF THE DISCLOSURE

A ball valve for use between standard ASA flanges, wherein the body of the valve is shaped to accommodate the bolts connecting the flanges without interference, and is of the maximum internal diameter consistant with the provision of a seal no greater in diameter than the seating faces of the flanges, whereby the maximum size of valve ball can be used to maximize the flow capacity of the valve. The valve body is supported by retaining rings at each end which engage the flanges and transmit a compressive load from the flanges to the body, as well as for carrying upstream and downstream seals in positions to sealingly engage the valve ball.

BACKGROUND OF THE INVENTION

Field of the invention

This invention relates generally to improvements in ball valves, and more particularly, but not by way of limitation, to ball valves adapted for use between standard flanges.

Description of the prior art

It is well know that butterfly or disc type valves are commonly used between standard ASA flanges. In this type of valve, the valve member may be of substantially the same diameter as the inner diameters of the flanges and still not restrict the flow of fluid through the valve when the valve is open. Also, the valve chamber of a disc or butterfly type valve may be of very limited length, such that the flanges and interconnecting bolts need not be excessively pressure rated for the desired pressure rating of the valve. However, the use of ball valves between standard flanges has not been widely adopted, particularly in the larger sizes of valves, such as from ten inches on up.

In a ball valve, the valve ball must be made substantially larger than the inner diameters of the sections of pipe connected to the valve, and hence larger than the inner diameters of the flanges which may be used for mounting the valve between the sections of pipe; otherwise, the flow port through the valve ball will be substantially smaller than the bores of the connecting members and materially restrict the maximum flow the valve may handle. On the other hand, if the valve body is shaped to present an area having a larger diameter than the areas of the seating faces of the flanges, which area is effected by body pressure to impose forces on the flanges tending to part the flanges, then the flanges must be rated higher than the anticipated working pressure of the valve, with the result that excessively heavier and more expensive flanges are required. As is well known, a standard ASA flange is rated by the maximum pressure the flange and connecting bolts will withstand when such pressure is exerted across the seating face or area of the flange. Thus, for a given diameter, the weight and cost of standard flanges increases as the pressure rating increases.

In one type of ball valve adapted for use between flanges, the pressure rating of the flanges is minimized by making the inner diameter of the body at the central

2 portion of the body a maximum, and then decreasing or "swedging" the opposite end portions of the valve body to diameters which mate with the seating faces of the cooperating flanges. However, with this construction, the valve ball cannot be inserted through either end of the valve body, thereby necessitating the use of a bonnet construction on the valve body for use in assembling and repairing the valve.

It is also possible, of course, to provide specially constructed flanges and maximize the size of valve ball which can be used, but this involves a substantially more expensive structure, as well as a more bulky structure, particularly in larger sizes of valves.

SUMMARY OF THE INVENTION

The present invention contemplates a novel ball valve structure for use between a pair of standard ASA flanges which includes a tubular body having an annular seating face on each end thereof coterminous with the inner periphery of the body, each of the body seating faces having an inner diameter greater than the inner diameters of the flanges, but less than the outer diameters of the seating faces of the flanges, and an outer diameter greater than the outer diameters of the seating faces of the flanges. At least one retaining ring is positioned between one end of the valve body and the adjacent flange and has a seating face at one end thereof conforming in size and shape to the seating face of the respective flange, while the opposite end thereof conforms in size and shape to the seating face on the respective end of the valve body, such that the load imposed on both the retaining ring and the body when the flanges are bolted together is a substantially compressive force, whereby the valve body may be of minimum wall thickness and the flanges may be rated at the desired operating pressure of the valve.

An object of this invention is to provide a ball valve which may be easily repaired and assembled.

Another object of this invention is to provide a ball valve having a maximum flow area therethrough, but wherein the valve is adapted for use between standard flanges.

A further object of this invention is to provide a ball valve for use between standard flanges wherein the inner diameter of the valve body is maximized, and yet the forces imposed on the valve body are primarily compressive forces when the valve is assembled between the flanges.

Another object of this invention is to provide a ball valve for use between standard flanges wherein the flanges may be rated at the desired pressure rating of the valve.

A still further object of this invention is to provide a ball valve for use between standard flanges which may be economically constructed and will have a minimum weight.

Other objects and advantages of the invention will be evident from the following detailed description when read in conjunction with the accompanying drawings which illustrate the invention.

BRIEF DESCRIPTION OF THE DRAWINGS

FIG. 3 is a view similar to FIG. 2 but showing a slightly modified structure.

FIG. 4 is the structure of FIG. 3 shown in the position of the parts when the valve is fully assembled in operation condition.

FIG. 5 is another view similar to FIG. 2 of still another modified structure.

DESCRIPTION OF THE PREFERRED EMBODIMENTS

Figure 1:
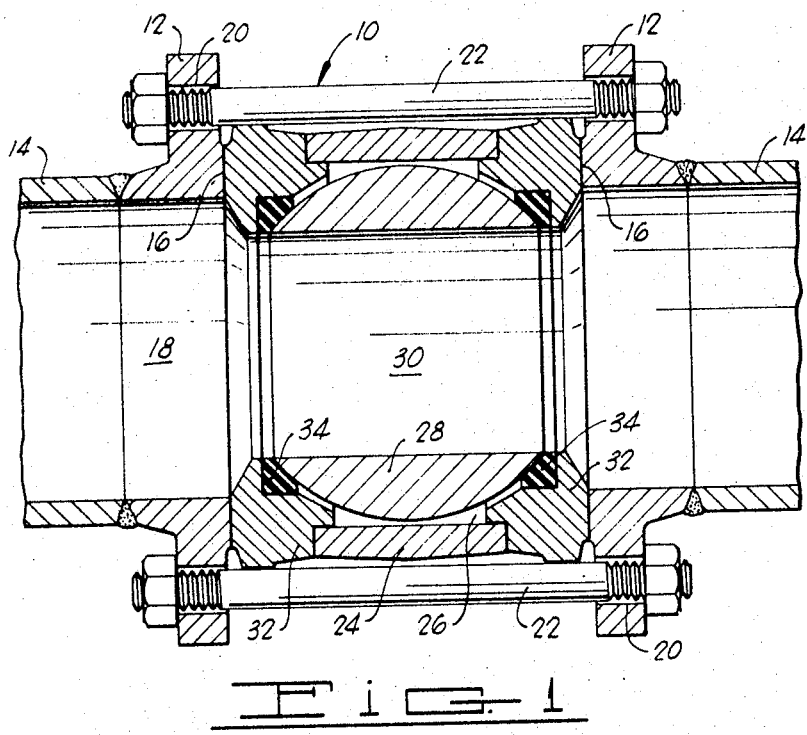
FIG. 1 is a complete cross sectional view through a valve constructed in accordance with this invention.

Referring to the drawings in detail, and particularly FIG. 1, reference character 10 generally designates a ball valve constructed in accordance with this invention adapted for use between a pair of standard ASA flanges 12. The flanges 12 are shown in the drawing as being of the welded type, and, therefore, being welded to the adjacent sections 14 of a flow line in which the valve is to be used, but it will be readily understood that the flanges 12 may be of any desired type, such as slip-on or threaded. Each of the flanges 12 is provided with a seating face or area 16 encircling the bore 18 through the flange, as well as a plurality of circumferentially spaced bolt holes 20 around the seating face 16 to receive the usual interconnecting bolts 22.

The valve 10 comprises a tubular body or housing 24 forming a valve chamber 26 in which is supported a valve ball 28 having the usual flow port 30 therethrough. The valve stem and handle assembly required for turning the valve ball 28 between its open and closed positions is not shown in the drawing, since such assembly is well known in the art and forms no part of the present invention. The body 24 is supported concentrically between the flanges 12 by means of a retaining ring 32 between each end of the body and the respective flange, and it will be observed that each retaining ring 32 carries a seal ring 34 of any desired composition in a position to sealingly engage the respective side of the valve ball 28.

Figure 2:
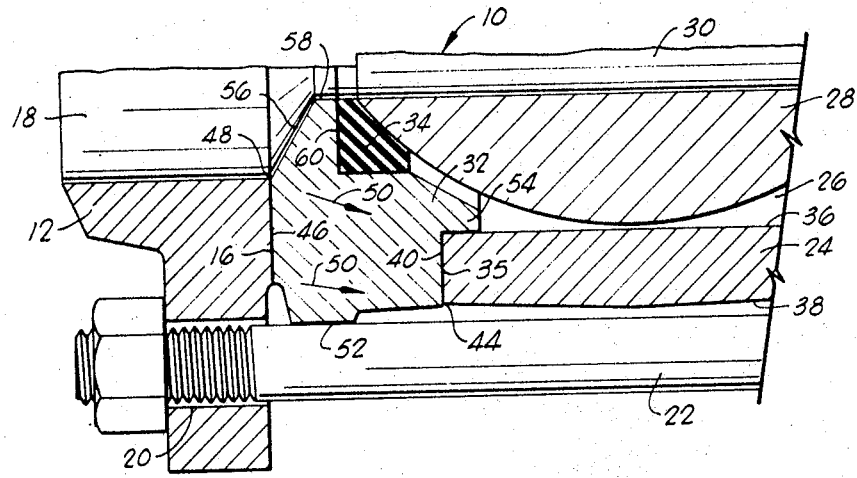
FIG. 2 is an enlarged illustration of a portion of the valve shown in FIG. 1 to more clearly illustrate details of construction.

As shown more clearly in the enlarged, partial cross sectional view of FIG. 2, each end of the body 24 provides a seating face 35 coterminous with the inner periphery 36 of the body, and, in this embodiment, the entire area of each end of the body is a seating face, such that the outer periphery of each seating face 35 is coterminous with the outer periphery 38 of the body 24. The inner diameter of the body 24 is greater than the inner diameter of the seating face 16 of each of the flanges 12, but less than the outer diameter of the seating face 16 of each of the flanges 12. Thus, the inner periphery 36 of the body 24, and, hence, the inner periphery of each body seating face 35 is axially aligned with an intermediate portion of the flange seating faces 16. The outer diameters of the body seating faces 35, on the other hand, are greater than the outer diameters of the seating faces 16 of the flanges 12. Further, it is important that the area of each seating face 35 be more than one-half the area of the respective flange seating face 16 to maximize the occurrence of compressive loads in the respective retaining ring 32, as will be set forth below. The outer diameter of the body 24 is as large as necessary to provide the required wall thickness for the desired pressure rating. It will be observed that the bolts 22 will be circumferentially spaced around the body 24 and in valves of some sizes and pressure ratings, the outer periphery 38 of the body 24 is spaced slightly radially inward of and out of interference with the bolts 22 when the valve is assembled between the flanges as shown in the FIGS. 1 and 2 embodiment.

The retaining rings 32 are constructed of any desired relatively high strength material, such as the same metal as the body 24 is formed, to carry the load imposed thereon (by the flanges 12 and the body 24 when the bolts 22 are secured) without appreciable distortion. It will be observed in FIG. 2 that each retaining ring 32 has an annular seating face 40 conforming in size and mating with the respective seating face 35 of the body 24. In the embodiment shown in FIG. 2, the mating retaining ring seating face 40 and body seating face 35 are flat and extend transversely with respect to the longitudinal axis through the flanges 12 and body 24. In this embodiment, it is normally desired to insert a gasket 44 between the mating seating faces 40 and 35 to assure no leakage of fluid from the valve between these elements. Each retaining ring 32 is also provided with an annular seating face 46 conforming in size and mating with the seating face 16 of the respectice flange 12. Here again, a gasket 48 is preferably positioned between the mating seating faces 16 and 46 to prevent the leakage of fluid between each flange 12 and the respective retaining ring 32.

As will be observed in FIG. 2, the seating face 46 of each retaining ring 32 is larger than the seating face 40 of the respective retaining ring, and the seating face 40 extends radially outward beyond the seating face 46. As a result, the forces imposed on the body 24 when the flanges 12 are bolted up by the bolts 22 will be transmitted through the retaining rings 32 at a slight angle to he longitudinal axis of the flanges 12 and the body 24, as indicated by the arrows 50. However, since the inner periphery of each body seating face 35 is aligned with an ntermediate portion of the respective flange seating face 16; the outer periphery of each body seating face 35 is only slightly greater than the outer diameter of the respective flange seating face 16 and the area of the body seating face 35 is more than one-half the area of the flange seating face 16, this angle is retained sufficiently small that the forces transmitted through the retaining rings 32 will be almost completely compressional forces to minimize the strength requirements of both the retaining rings 32 and the body 24.

The outer periphery 52 of each retaining ring 32 is shaped to engage the bolts 22 when the bolts 22 are assembled through the bolt holes 20 of the flanges 12, such that the retaining rings 32 will be held concentric with the flanges 12, and the seating faces 16 and 46 will be aligned. Also, each retaining ring 32 is provided with an axially extending flange 54 sized to slidingly fit in the inner periphery 36 of the respective end of the body 24, whereby the retaining rings 32 will support the body 24 concentrically with respect to the flanges 12.

Each retaining ring 32 extends radially inward from the walls of the bore 18 of the adjacent flange 12 slightly into the flow path through the valve, but the outer face 56 of each retaining ring exposed to the flow passageway is tapered inwardly toward the center of the valve to minimize turbulence in the flow of fluid through the valve. The extreme inner periphery 58 of each retaining ring 32 is of the same, or substantially the same, diameter as the flow port 30 through the valve ball 28. Each seal ring 34 will normally be an elastomer, such as a natural or synthetic rubber composition, or one of the well known plastic materials, such as nylon or Teflon, depending upon the anticipated service to be encountered. Each seal ring 34 may or may not be bonded in a mating groove 60 formed in the respective retaining ring 32, as may be required by service conditions. In any event, however, each seal ring 34 provides a seal between the respective retaining ring 32 and the adjacent surface of the valve ball 28, when the valve ball is turned to a closed position, to effectively prevent the leakage of fluid around the valve ball. It will also be observed that each seal ring 34 is positioned radially inward of the walls of the bore 18 of the adjacent flange 12, such that the seal ring will not be distorted when the flanges 12 are tightly clamped against the retaining rings by the bolts 22. As previously indicated, the forces imposed on the retaining rings 32 will be almost solely compressional forces and there will be a minimum tendency for the retaining rings 32 to be bent or distorted, and the preferred positioning of each seal ring 34 places the seal-receiving recess 60 out of the path of the compressive forces 50.

As previously indicated, the present invention is particularly useful in larger sizes of valves, since the pressure rating of a standard ASA flange is directly related to the maximum diameter of the seating face of a flange, and an increase in the diameter of the seating face of a flange has more affect on the pressure rating in the larger sizes of flanges. In the present invention, the seal provided between each retaining ring 32 and the respective end of the body 24 will be at a diameter no greater than the outer diameter of the seating faces 16 of the flanges 12, such that pressure in the body 24 tending to separate the flanges 12 can have no greater affect than if such pressure were exposed to the seating faces 16 of the flanges 12. As a result, flanges 12 having a rating equal to the desired operating pressure of the valve may be used. On the other hand, a valve ball 28 having an outer diameter substantially greater than the diameters of the flange bores 18 may be used to increase the opening through the valve when the valve is in an open position and minimize the restriction to the flow of fluid through the valve.

A slightly modified valve construction 10a is shown in FIG. 3. This valve utilizes the same construction as the valve 10 previously described, except that each retaining ring is slightly modified at the seating face thereof mating with the valve body 24; thus the single retaining ring illustrated in FIG. 3 has been designated by reference character 32a. The seating face 40a of the modified retaining ring 32a is flat and conforms to the mating seating face 35 of the valve body 24, except that the seating face 40a is raised at 62 adjacent the inner periphery 36 of the body 24. The raised portion 62 is extended from the remaining portion of the seating face 40a only a sufficient distance to assure that the portion 62 will engage the mating seating face 35 of the valve body prior to engagement between the remaining portion of the seating face 40a and the body seating face 35. For example, the portion 62 may be raised 0.005 inch beyond the remaining portion of the seating face 40a in a typical construction.

When the flange bolts 22 are tightened on the valve 10a, the raised portion 62 is distorted by the forces imposed on the retaining ring 32a until the remaining portion of the seating face 40a engages the body seating face 35 to provide a substantially flat seating face 40a engaging the entire body seating face 35 as illustrated in FIG. 4. The compressive load applied by the flange bolts 22 will thus be carried across the entire seating face 35 of the body 24. However, the material of the ring 32a and the body 24 adjacent the inner periphery 36 of the body will be more highly stressed to assure that a seal is provided between the retaining ring 32 and the body 24 at the smallest diameter. This construction not only eliminates the need of a separate seal ring or gasket between the retaining rings 32a and the body 24, but further assures that pressure in the body 24 will be exposed to minimum areas in directions tending to part the flanges 12, whereby the ratings of the flanges 12 may be minimized.

FIG. 5 illustrates another slightly modified valve construction 10b. In this embodiment, both the body and retaining rings are modified. The body 24a is increased in wall thickness, as may be required in some valves of particular sizes and pressure ratings, until the outer diameter of the body is greater than the diameter of the circle in which the flange-connecting bolts 22 are positioned. Thus, the body 24a is provided with a plurality of circumferentially spaced holes 63 arranged to mate with the flange bolt holes 20 and accommodate the bolts 22. It must be noted, however, that the holes 63 in the body 24a are sized to only loosely receive the bolts 22, such that the body does not interfere with the bolts 22. In this embodiment, the bolt holes 63 serve to center the body 24a with the flanges 12; therefore, the modified retaining ring 32b need not engage the bolts 22 and may be of a smaller outside diameter than previously described.

FIG. 5 also illustrates a modification of the seating faces at the opposite ends of the body 24a. Each modified seating face 35a of the modified valve body 24a is flat over the major portion thereof conforming to the mating retaining ring seating face 40, except for the inner portion 64 thereof which is extended or raised. The portion 64 may be raised or extended from the remaining portion of the respective body seating face 35a a distance of, for example, 0.005 inch, to assure that the initial engagement between the retaining ring 32 and the respective end of the body 24a will be at a point adjacent the inner periphery 36 of the body. As in the FIG. 3 embodiment, this construction assures that a seal is provided between the retaining rings and the body adjacent the inner periphery of the body. And, as in the FIG. 3 embodiment, the raised portion 64 is distorted sufficiently to provide engagement between the seating face 40 of each retaining ring 32 and the entire mating seating face 35a of the valve body 24a when the flange bolts 22 are tightened to result in a mating of the retaining rings and the body as illustrated in FIG. 4.

From the foregoing it will be apparent that the present invention provides a novel valve structure adapted for use between standard flanges wherein the rating of the flanges may be a minimum, and no greater than the desired operating pressure of the valve. Thus, the flanges will be the most economical which may be used. Also, the dimensional relationships between the valve body and the flanges assures that almost solely compressional forces will be imposed on the body and on the retaining rings positioned between the opposite ends of the body and the flanges to further minimize the weight and strength requirements of the body and retaining rings. Finally, it will be apparent that the valve assembly of this invention may be easily assembled and disassembled, as for repair or replacement of the seals utilized in the valve.

What is claimed is:

1. In a valve for use between a pair of standard ASA tubular flanges having equally sized annular seating faces facing each other and mating bolt holes around the seating faces receiving connecting bolts, the combination of:
   a tubular body adapted to be positioned concentrically between the flanges out of interference with the flange-connecting bolts, said body having an annular seating face on at least one end thereof coterminous with the inner periphery of the body and facing the respective flange, said body seating face having an inner diameter greater than the inner diameters of the seating faces of the flanges, but less than the outer diameters of the seating faces of the flanges, and having an outer diameter greater than the outer diameters of the seating faces of the flanges, said body seating face further having an area greater than one-half the area of the seating face of the respective flange;
   a valve ball supported in the body for turning between open and closed positions and having an outer diameter greater than the inner diameters of the flanges;
   a retaining ring to be positioned between said one end of the body and one of the flanges, said retaining ring having a seating face on the end thereof facing the flange of a size conforming to the seating face of the flange, and a seating face on the end thereof facing the body of a size conforming to the seating face on the respective end of the body; and
   a seal ring carried by the retaining ring radially inward of the body in a position to seal against the valve ball.

2. The combination of claim 1 wherein the seating face of the body and the cooperating seating face of the retaining ring are extended normal to the longitudinal axis of the body.

3. The combination of claim 1 wherein the retaining ring includes an axially extending flange on the end thereof facing the body sized to slidingly fit in the body and align the body and retaining ring.

4. The combination of claim 3 wherein the outer periphery of the retaining ring is shaped to engage the flange-connecting bolts and align the retaining ring and body with the flanges.

5. The combination of claim 3 wherein the body is shaped to be centered by the flange-connecting bolts.

6. The combination of claim 1 wherein the seal ring is carried by the retaining ring radially inward of the inner diameters of the seating faces of the flanges.

7. The combination of claim 1 wherein a minor portion of the seating face of the retaining ring facing the body, adjacent the inner periphery of the body, is raised to initially engage the body when the retaining ring is clamped between the respective flange and the body and provide a seal between the retaining ring and the body adjacent the inner periphery of the body.

8. The combination of claim 1 wherein the seating face of the body is raised adjacent the inner periphery of the body to initially engage the retaining ring seating face when the retaining ring and body are clamped together to form a seal between the retaining ring and the body adjacent the inner periphery of the body.

9. In a valve for use between a pair of standard ASA tubular flanges having equally sized annular seating faces facing one another and mating bolt holes around the seating faces receiving connecting bolts, the combination of:

- a tubular body adapted to be positioned concentrically between the flanges out of interference with the flange-connecting bolts, said body having an annular seating face on each end thereof coterminous with the inner periphery of the body and facing the respective flange, each of said body seating faces having an inner diameter greater than the inner diameters of the seating faces of the flanges, but less than the outer diameters of the seating faces of the flanges, and having an outer diameter greater than the outer diameters of the seating faces of the flanges, each of said body seating faces further having an area greater than one-half the area of the respective flange seating face;
- a valve ball supported in the body for turning between open and closed positions and having an outer diameter greater than the inner diameters of the flanges;
- a retaining ring to be positioned between each end of the body and each of the flanges, each of said retaining rings having a seating face on the end thereof facing the respective flange of a size conforming to the seating face of the flange, and a seating face on the end thereof facing the body of a size conforming to the seating face of the respective end of the body; and
- a sealing ring carried by each retaining ring radially inward of the body in a position to seal against the valve ball.

10. The combination of claim 9 wherein each seating face of the body and the cooperating seating face of the respective retaining ring are extended normal to the longitudinal axis of the body.

11. The combination of claim 9 wherein each retaining ring includes an axially extending flange on the end thereof facing the body sized to slidingly fit in the body and align the body and the retaining rings.

12. The combination of claim 11 wherein the outer periphery of each retaining ring is shaped to engage the flange-connecting bolts and align the retaining rings and the body with the flanges.

13. The combination of claim 11 wherein the body is shaped to be centered by the flange-connecting bolts.

14. The combination of claim 9 wherein each seal ring is carried by the respective retaining ring radially inward of the inner diameters of the seating faces of the flanges.

15. The combination of claim 9 wherein a minor portion of the seating face of each retaining ring facing the body, adjacent the inner periphery of the body, is raised to initially engage the body when the retaining rings are clamped between the flanges and the body and provide seals between the retaining rings and the body adjacent the inner periphery of the body.

16. The combination of claim 9 wherein a portion of each seating face of the body adjacent the inner periphery of the body is raised to initially engage the mating seating face of the adjacent retaining ring when the retaining rings and body are clamped together to form a seal between each retaining ring and the body adjacent the inner periphery of the body.

References Cited

UNITED STATES PATENTS

| | | | |
|---|---|---|---|
| 3,157,380 | 11/1964 | Sivyel | 251—315 |
| 3,405,910 | 10/1968 | Scaramucci | 251—148 |

M. CARY NELSON, Primary Examiner

WILLIAM R. CLINE, Assistant Examiner

U.S. Cl. X.R.

251—315